March 8, 1960     R. S. FERRÉ, SR     2,927,592
SHOCK ACTUATED VALVE
Filed July 15, 1957
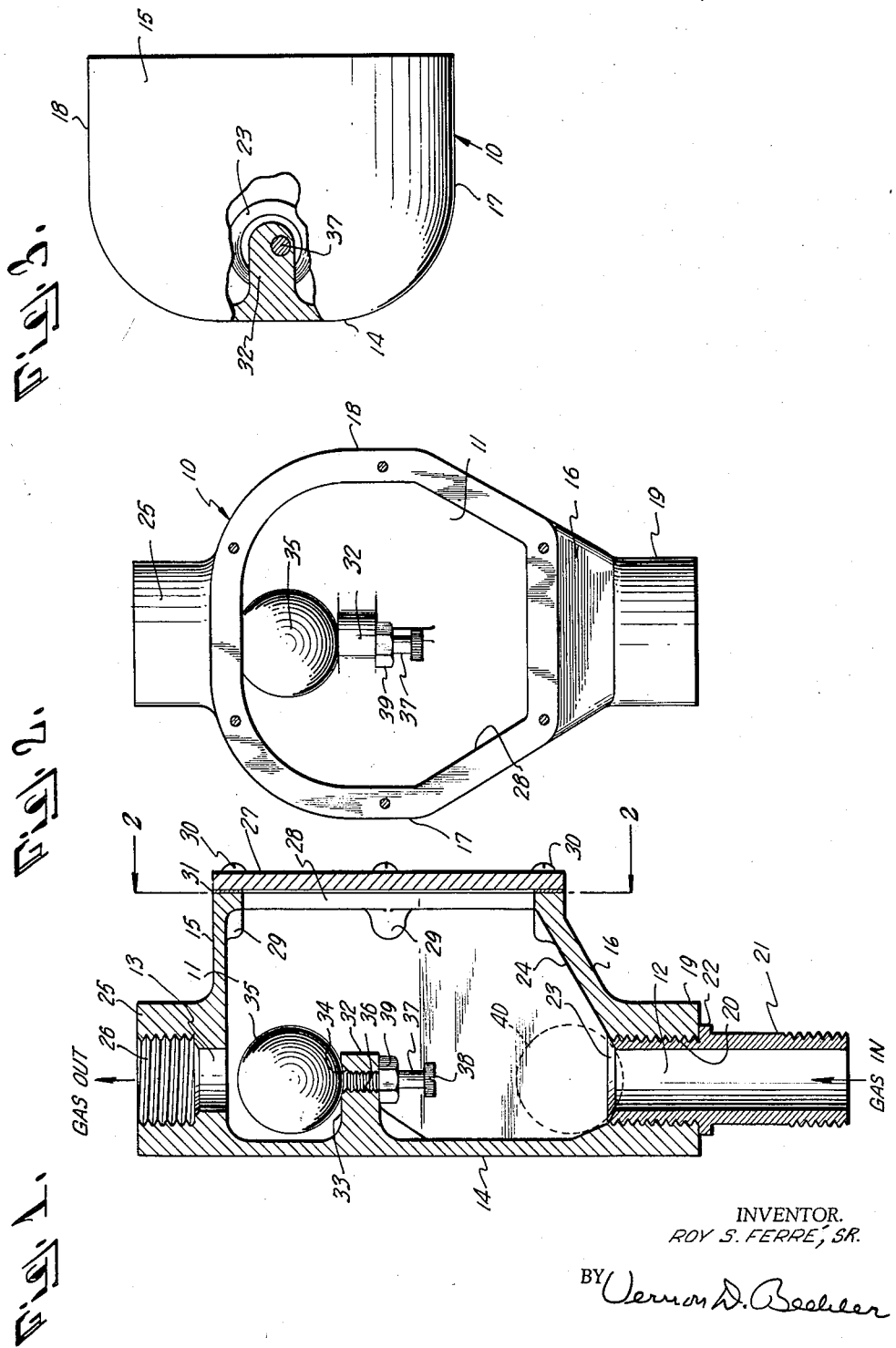
INVENTOR.
ROY S. FERRÉ, SR.
BY *Vernon D. Beeler*
ATTORNEY.

United States Patent Office 2,927,592
Patented Mar. 8, 1960

2,927,592

SHOCK ACTUATED VALVE

Roy S. Ferré, Sr., Los Angeles, Calif.

Application July 15, 1957, Serial No. 671,976

2 Claims. (Cl. 137—38)

The invention relates to valves for the shutting off of gas lines and particularly gas lines handling gas at relatively low pressures and substantial volumes such as gas lines for heating and cooking purposes which may be run into factories and residences. More particularly the invention relates to a valve device which is capable of automatically shutting itself off whenever subjected to shock.

It is common knowledge that gas supplied to factories and residences for heating purposes, cooking purposes and other uses is a very combustible fluid and dangerous when not controlled. Although such gas is normally supplied under relatively low pressure, should some event happen such as to permit the escape of gas in a building, the slightest spark may readily cause fire or explosion and result in the damage or perhaps loss of the property with a possible attendant loss of life. Although contingencies such as might create such a danger arise infrequently, they are nevertheless potential especially in large industrial areas and heavily populated communities.

One commonly known disturbance of the kind made reference to consists of earthquake shocks which in certain sections of the country occur with some degree of frequency. Should gas lines within a building be even slightly ruptured on the occasion of an earthquake sufficient to permit leak of gas from the lines in the building, a potential danger exists unless there is some means of shutting off the supply of gas on the exterior of the building, although manually actuated valve means is often provided for such purpose. On those occasions where automatic shut-offs have been attempted, such devices have been complicated and expensive to the point where they have not met with any wide-spread acceptance.

Even in the absence of prospect of earthquake shock there remains the possibility and even the probability of explosion or fires, particularly in industrial areas, such as might readily create a dangerous condition should gas escape from broken lines. Quite ordinarily fire in a building generates shocks as, for example, by the falling of walls and such circumstances may cause ruptured gas lines and permit highly inflammable gas to escape. It therefore becomes highly desirable to have some means actuated by a shock condition capable of automatically shutting off the flow of gas especially at locations which in case of fire might be inaccessible.

It is therefore among the objects of the invention to provide a new and improved shock actuated gas valve which is positive in its action and which is capable of automatically shutting off the flow of gas in the event of some unprecedented shock condition.

Another object of the invention is to provide a new and improved shock actuated valve which is simple in construction thereby making it capable of manufacture and sale at reasonable prices and which at the same time is rugged in its construction such that once installed it can be neglected until called upon to operate.

Still another object of the invention is to provide a new and improved shock actuated gas valve wherein moving parts are maintained to a minimum and which is adjustable with respect to its sensitivity so that it can be set to automatically actuate at virtually any magnitude of shock.

Still another object of the invention is to provide a new and improved shock actuated valve which is safe, tamper-proof, easy to install, and which is of such character that it can be located directly in the gas line on the exterior of any structure and adjacent the location where gas is normally admitted into such structure.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a central vertical section through a valve embodying the invention.

Figure 2 is a view taken as on line 2—2 of Figure 1.

Figure 3 is a top plan view of the valve with a portion of the valve body being cut away to expose certain parts taken in horizontal section in the interior of the body.

In an embodiment of the invention chosen for the purpose of illustration there is shown a valve body 10 having a chamber 11 therein at the bottom of which is an inlet passage 12 and at the top of which is an outlet passage 13. The body is preferably constructed of a single casting having a rear wall 14, a top wall 15, a bottom wall 16, and side walls 17 and 18. Projecting downwardly from the bottom wall is a boss 19 of substantial dimension having an internal threaded portion 20 into which is mounted a nipple 21 of customary dimension and construction. A shoulder 22 may be provided to limit the admission of the nipple into the threaded passage when the assembly is made. It will be appreciated that in the average type installation the nipple 21 will be of pipe size, usually not less than three-quarter inch and frequently much larger, although on some special occasions smaller pipe sizes may be encountered.

As a practical advantage the nipple may be provided at its inner end with a semi-spherical valve seat 23 which at its innermost position is substantially flush with an inside surface 24 of the bottom wall 16. It will be noted especially that the inside surface 24 slopes rather sharply from the surrounding walls downwardly and centrally toward the valve seat where the wall is substantially flush with the valve seat.

At the upper end of the body is a boss 25 within which is located the outlet passage 13. A threaded portion 26 may be provided for the accommodation of an outlet nipple or gas pipe leading from the valve to a building structure.

In order to close the chamber 11 there is provided a cover 27 which overlies an opening 28 on the front side of the valve body. Bosses 29 may be provided to accommodate screws 30 by means of which the cover is securely held in place sealed by means of a gasket 31.

Within the chamber and extending forwardly of the rear wall 14 is a bracket 32 which is located slightly above the horizontal mid-portion of the chamber 11. On an upper face 33 of the bracket is a pocket 34 which is located slightly toward one side of the center line. The pocket is adapted to receive a smooth surfaced spherical ball 35 which in initial or normal position rests upon the pocket on the bracket.

To adjust the sensitivity of the mounting of the ball on the bracket there is provided an adjusting screw 36 threadedly engaging the bracket and projecting at its upper end into the pocket 34. An adjusting head 37 enables the screw to be rotated either manually by grasping the head with fingers or pliers or by making use of a suitable screw-driver slot 38. A lock nut 39 is employed for locking the screw in its selected position of adjustment.

It will be noted that the cover 27 and opening 28 are of ample dimensions making access to the chamber 11 easy, the opening 28 and even the chamber 11 being of such size that an operator may be permitted to insert his entire hand into the chamber.

In operation the ball 35 will normally be in the solid line position illustrated in Figures 1 and 2. In this position an appropriate adjustment can be made to the end that the ball will be unseated by a shock of desired magnitude. In some instances the ball may be sensitive and subject to dismounting under a slight shock if those conditions might be dangerous. Under other and perhaps normal circumstances the adjusting screw will be retracted to the point where the ball will be relatively stable upon the bracket. Once adjusted and in place the cover 27 is securely attached and sealed.

Thereafter should a shock occur either in the ground through which the pipe line passes or in the building into which the outlet pipe line extends, the shock will tilt the ball from its seat. When the ball falls from the bracket, it will strike one slope or another of the bottom 16 and will move by gravity down the slope into the lowermost position shown in broken lines 40 of Figure 1, in which position the ball will seat snugly upon the annular valve seat 23. Inasmuch as the ball 35 is preferably of solid metal, the weight of the ball alone will be sufficient to effectively close off the inflow of gas through the inlet passage under pressures normally encountered. Since only that gas residing in the system will then be capable of passing to the structure, such passage of gas will not be under pressure and the hazard due to the possibility of escaping gas will be virtually minimized.

Even though shock conditions hereinabove referred to may not be present, should some occasion arise where it might become desirable to have the gas shut off in a structure, any person, even one in nowise familiar with the manipulation of gas valves, can shut off the flow of gas by merely striking the body a sharp blow with some appropriate instrument such as a bar, hammer, or even a rock. The valve, moreover, may be so set that even kicking the body may be depended upon to cause the valve to shut off.

When it becomes desirable to reseat the valve it is necessary only to remove the cover 27 and thereafter manually to lift the valve 35 from its position on the valve seat 23 and replace it on the bracket. The cover thereafter is replaced, sealed and secured and the valve is ready to be left until some other occasion might arise where it will perform its automatic shut-off function.

From the foregoing description it will be appreciated that the shock responsive valve made reference to is of such simple construction that its installation in a gas line can be made at virtually a minimum expense. The valve body is rugged and of such size that it is readily identifiable, which size is taken advantage of in providing a chamber of ample dimensions so that unskilled persons can readily adjust and reset the valve whenever such occasion might require. By keeping the moving parts to a virtual minimum, assembly of the valve is simplified and the ultimate cost to the consumer is kept to a level wherein the safety advantages of the valve can readily be enjoyed by all.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A shock actuated valve comprising a valve body having inside top, bottom, rear, and two side walls defining a chamber therein, said body having an opening in the front thereof, a cover removably secured to the body over said opening forming an inside front wall for the chamber and closing the chamber against access from the exterior, a passageway at the bottom of the chamber and another passageway at the top of the chamber, an annular valve seat in the chamber surrounding said passageway at the bottom, said bottom wall having sloping portions extending progressively downwardly and inwardly toward said valve seat, a bracket having a front edge, two side edges, and a rear edge and being integral at its rear edge on the rear wall of said chamber and concealed entirely within the chamber, an annular configuration on the upper side of said bracket, a smooth metal ball valve having an initial valve open position on the configuration on said bracket said front and side edges of the bracket being spaced from the front and side walls of the chamber, respectively, by a distance greater than the diameter of the ball whereby said ball is subject to dislodgement under shock and adapted to fall over any of said front and side edges within the chamber and the sloping portions thereof to a position on said valve seat thereby to close the passageway at the bottom, said cover being removable to provide access to the chamber for replacement of the ball valve on the bracket.

2. A shock actuated valve for low pressure gas lines comprising a valve body having top, bottom, rear, and two opposite side walls defining a chamber therein, said body having an opening in the front thereof, a cover removably secured over the opening in the body forming an inside front wall for the chamber, an inlet passageway at the bottom of the chamber and an outlet passageway at the top of the chamber, an annular valve seat in the chamber surrounding said inlet passage, said bottom wall having sloping on all sides progressively downwardly and inwardly toward said valve seat, a bracket having a front edge, two opposite side edges, and a rear edge, and being integral at its rear edge on the rear wall of said chamber, an annular pocket on the upper side of said bracket, a smooth metal ball valve having an initial valve open position on the pocket on said bracket, said front and side edges of the bracket being spaced from the front and side walls of the chamber respectively by a distance greater than the diameter of the ball whereby said ball is subject to dislodgment under shock and adapted to fall over any of said front and side edges within the chamber and down the slope of the bottom wall to a position on said valve seat thereby to close the inlet passageway, an adjusting screw threadedly mounted on the bracket and projecting upwardly through the bracket into said pocket whereby to adjust the sensitivity of the mounting of the ball valve on the bracket, said screw being accessible only from within the chamber, said cover being removable to provide access to the chamber for replacement of the ball valve on the bracket and adjustment of said screw.

References Cited in the file of this patent

UNITED STATES PATENTS

| 472,579 | Lundstedt | Apr. 12, 1892 |
| 827,823 | Starr | Aug. 7, 1906 |
| 2,585,316 | Hobson | Feb. 12, 1952 |